United States Patent Office 3,129,102
Patented Apr. 14, 1964

3,129,102
STABILIZED PEANUT BUTTER AND METHOD
OF PRODUCING THE SAME
Judson H. Sanders, Wyoming, Ohio, assignor to The
Procter & Gamble Company, Cincinnati, Ohio, a corporation of Ohio
No Drawing. Filed Apr. 9, 1962, Ser. No. 185,831
6 Claims. (Cl. 99—128)

This invention relates to peanut butters. More specifically, it relates to a combination of ground peanuts and peanut oil to which has been added a particular type of vegetable oil material thereby providing a product which has unusual stability and tolerance to a wide variety of processing conditions.

Peanut butters are customarily made by roasting and blanching raw peanuts and then grinding them. The resulting product is a pasty material which is a mixture of peanut particles and oil which has been released from the cellular structure of the nuts during the grinding operation. If this product is allowed to stand for a period of time, the oil will separate from the product and will form a separate layer on top and a rigid crumbly mass underneath.

It is known that the addition of hydrogenated oils, such as hydrogenated peanut oil, will tend to stabilize peanut butter so as to prevent an excessive amount of oil separation by formation of a crystal matrix which lends rigidity to the mass and prevents settling of peanut particles. It has been found however, that the addition to peanut butter of a large enough quantity of highly hydrogenated fats such as hydrogenated peanut oil, to stabilize the product substantially completely against oil separation, will tend to make the peanut butter excessively firm at ordinary temperatures of use. As a result the product is difficult to spread, has a waxy taste, and tends to cling to the roof of the mouth when it is eaten.

Another disadvantage of the use of known hydrogenated fat stabilizers such as hydrogenated peanut oil is the wide variance of product quality which results from varying the temperatures at which the material is processed. In grinding peanuts to make peanut butter the temperature of the product will increase to about 160° F. or higher. Stabilizing material is added during the grinding step or while the product is at an elevated temperature. In common commercial practice the product is then rapidly chilled, customarily using a device such as a scraped wall heat exchanger ("chiller"), to a temperature below the freezing point of at least a portoin of the fat solids present in the product. The chiller outlet temperatures may range from as low as about 70° F. to as high as about 120° F. Variations in the chiller outlet temperatures frequently occur even during plant runs, and conventional peanut butter stabilizers at any given level of usage have a widely varying effect on the firmness, stability, and eating quality of the final product, depending upon the exact chiller outlet temperature. Such variations may be caused by fluctuations in stock and coolant flow rates and inlet temperatures.

Yet another disadvantage of the use of known hydrogenated fat stabilizers is the wide variance of product quality caused by variations in mechanical agitation of the partially formed crystal matrix following chilling. Any physical working of peanut butters stabilized by hydrogenated fats after they are chilled, but prior to the time they are packaged, will influence greatly the firmness and degree of stabilization of the peanut butter. Such working may involve agitation during completion of the crystallization which occurs subsequent to the rapid chilling step. Flow through extended piping will cause some agitation of the product. Some types of filling machines are provided with agitated hoppers which are designed to maintain the chilled peanut butter in pumpable condition until packaged.

Delay between chilling and packaging can also cause problems due to the rapid firming of peanut butters made from commonly-used stabilizers. Non-uniform residence time in equipment, especially where there is a low velocity flow in piping, will cause serious non-uniformity in product when hydrogenated peanut oil is used as a stabilizer.

It has now been found that the use of a hydrogenated rapeseed oil stabilizer in peanut butter will greatly minimize these prior art problems.

Accordingly, it is an object of this invention to provide a stabilized peanut butter composition which can be processed under a wide variety of conditions of temperature without adverse affect on the product quality.

A further object is to provide a peanut butter in which only a very small amount of stabilizer need be present.

Yet another object is to provide a peanut butter which can tolerate changes in agitation and/or delay between the chilling and packaging steps.

Other objects and advantageous features will be apparent from the following detailed description.

In general, the product of this invention is a peanut butter product comprising a homogeneous mixture of particles of peanuts and peanut oil, and having uniformly dispersed therein a stabilizing amount of a hydrogenated rapeseed oil stabilizer having an iodine value not greater than about 10.

The peanut butter can be prepared by conventional methods such as roasting and then grinding the peanuts. Likewise, the hydrogenated rapeseed stabilizer can be introduced into the peanut butter by known processes. These include adding it to the nuts in the grinding equipment, or thoroughly and homogeneously dispersing it in the hot ground peanut butter. Preferably the stabilizer should be in melted form when added at this stage. Other additives are commonly admixed during or following the grinding step. The peanut butter is then chilled to a temperature sufficiently low that at least some fat solids will form to produce a crystal matrix. Preferably this temperature should be below about 140° F.

It is understood, however, that the invention is not to be limited to any particular manner of making peanut butter or introducing the stabilizer.

A preferred hydrogenated rapeseed oil stabilizer for this invention is rapeseed oil hydrogenated to an iodine value of not more than about 10. If the rapeseed oil is hydrogenated to a higher iodine value the peanut butter in which it is incorporated will have a decreased tolerance to variations in processing conditions and the level required for stabilization will be undesirably increased.

The amount of stabilizer should range from about 0.5% to 5.0%, by weight of peanut butter, and preferably from about 1.5% to 3.0%. If less than about 0.5% of the stabilizer is present the peanut butter will have an undesirable amount of oil separation due to insufficient stabilization when the product is stored at room temperature. If more than about 5.0% of the stabilizer is used, the product will be too firm and will have a waxy taste. In general, larger amounts of stabilizer within the above range are required for higher processing temperatures.

Another stabilizer within the scope of this invention is a hydrogenated and superglycerinated rapeseed oil having an iodine value not greater than about 10. The superglycerination can be performed by well-known techniques such as reacting hydrogenated rapeseed oil with glycerine in the presence of a suitable catalyst. Preferred products generally contain about 20% to 40% monoglyceride, 20% to 40% diglyceride, and 20% to 40% triglyceride. These materials do not have as great a tolerance to variations in processing conditions as does the hydrogenated rapeseed oil.

Also included within the term hydrogenated rapeseed oil stabilizer is a composition containing at least about 90% hydrogenated rapeseed oil monoglyceride. This can be formed, for example, by a superglycerination of rapeseed oil hydrogenated to an iodine value of about 10, followed by separation, as by distillation, to obtain a fraction containing at least about 90% monoglyceride.

Peanut butter of this invention, incorporating the hydrogenated rapeseed stabilizer, can contain other hydrogenated or unhydrogenated fatty triglycerides, or hydrogenated superglycerinated fats or fatty monoglycerides. Such materials include soybean oil, cottonseed oil and peanut oil, either in natural form or in a hydrogenated and/or superglycerinated form. The exact amount to be used will vary depending upon the desired properties of peanut butter and the processing conditions which are to be used. A specific additional fatty material is cottonseed oil hydrogenated to an iodine value not greater than about 10, and which may be present in amounts up to about 1.0% by weight of the peanut butter.

Mixtures of the various hydrogenated rapeseed oil stabilizers can be used.

Other additives such as salt, lecithin, and sweetening agents such as sucrose, dextrose, and honey, can also be present in the peanut butter.

The following examples will serve to illustrate the invention with greater particularity.

EXAMPLE 1

Peanuts were roasted, blanched and cleaned to remove all debris. The peanuts were then fed into a peanut butter mill consisting of two vertical parallel circular plates, one fixed and one rotating. The inner surfaces of the plates were equipped with burrs or teeth, with a small clearance between the plates. The peanuts were fed into the center of the plates and were forced out the sides in the form of fine peanut particles and oil. In separate runs various stabilizers in ground solid form, each with about 1% salt and 2% dextrose, by weight of the final peanut butter, were fed into the peanut stream entering the mill. The ground product at a temperature of about 160° F. was fed into a recirculating system to thoroughly mix the ingredients.

The peanut butter with stabilizer was then fed into a second mill, which consisted of two horizontal circular carborundum plates, where it was further ground to finely divide the peanuts, salt, and dextrose. During this grinding step the temperature rose to about 180° F. The peanut butter was fed to a surge tank, and then passed through a scraped-wall chiller in which it was rapidly cooled down to the desired temperatures under test. It was then packaged in jars with the aid of conventional packing equipment.

The packaged peanut butter was stored for two months at a temperature within the range of 85° to 90° F. and then examined. There was no oil separation, and all of the peanut butters were readily spreadable. The stabilizers and chiller outlet temperatures used are shown in Table I.

*Table I*

| Stabilizer [1] | Percent By Weight of Peanut Butter | Chiller Outlet Temperature (° F.) |
|---|---|---|
| A | 2.8 | 100 |
| A | 2.8 | 110 |
| A | 2.8 | 120 |
| A | 2.8 | 130 |
| B | 2.6 | 100 |
| B | 2.6 | 110 |
| B | 2.6 | 120 |
| B | 2.6 | 130 |

[1] Stabilizer A—Rapeseed oil hydrogenated to an I.V. of 8. Stabilizer B—A mixture of: 94% Stabilizer A; 6% cottonseed oil hydrogenated to an I.V. of 8.

As can be seen by the above, satisfactory peanut butters can be made over a wide range of chiller outlet temperatures.

EXAMPLE 2

Under processing conditions comparable to those of Example 1, it was found that peanut butter stabilized with Stabilizer B of Example 1 could be held as long as 15 minutes with slot agitation, in a filling hopper after chilling and before packaging, without becoming too firm to tolerate the destructive flow attendant upon packaging which would disrupt the crystal matrix sufficiently to cause instability. Using conventional filling equipment a similar product made with hydrogenated peanut oil began to stiffen noticeably after 3 minutes, and after 5 minutes was too firm to tolerate the flow attendant upon packaging.

EXAMPLE 3

The process of Example 1 was repeated using only 1.5% of Stabilizer B. Using chiller outlet temperatures ranging from 80° to 103° F., products were made which were stable against oil separation and possessed good properties of spreadability, eating quality and appearance.

EXAMPLE 4

Peanuts were roasted, blanched and ground in a mill similar to that used in Example 1. The resulting peanut paste, at a temperature of about 160° F., was placed in an agitated, jacketed tank in which it was maintained at a temperature of 160° F. Stabilizers were melted and added to the paste at a level of 2.75%, by weight. 1.5% salt and 2% dextrose, both by weight, were added, and the mixture was agitated for one hour to form a homogeneous blend. The stabilizers used were rapeseed oil hydrogenated to an iodine value of about 10 and peanut oil hydrogenated to an iodine value of about 10.

The blends were passed through a scraped wall chiller, chilled to temperatures as specified in Table II, and then packaged in jars. Samples of the packed products were held at 70° F. for 24 hours.

Penetration measurements were then made of the various samples, as indicated in Table II, using a Precision Universal Penetrometer made by Precision Scientific Company, Chicago, Illinois. In this test a conical stainless steel needle was dropped onto the surface of the peanut butter from a height two inches above the surface. The needle tapered 8° off of center and was 19/32 inch in diameter at the top and had a point diameter of 1/32 inch. The needle and the shaft on which it was mounted weighed 47 grams. A penetration value of 175 to 300 indicates a product having good spreadability and resistance to oil separation. A penetration value of less than 175 indicates too firm a product, while a penetration value of more than 300 will indicate a product which is susceptible to oil separation, particularly under ordinary shipping conditions.

Table II

| Chiller Outlet Temperature (° F.) | Penetration (mm.) | |
|---|---|---|
| | Rapeseed Stabilizer | Peanut Stabilizer |
| 90 | 250 | 150 |
| 100 | 220 | 180 |
| 110 | 175 | 280 |
| 120 | 210 | 420 |
| 130 | 270 | 390 |

As can be seen from these data, when varying chiller outlet temperatures were used there was a wide variation in product containing peanut stabilizer whereas the product made with rapeseed stabilizer was substantially uniform.

What is claimed is:

1. A peanut butter comprising a homogeneous mixture of particles of peanuts and peanut oil, said peanut butter having dispersed therein from about 0.5% to 5.0%, by weight of peanut butter, of a hydrogenated rapeseed oil stabilizer having an iodine value not greater than about 10.

2. A peanut butter according to claim 1 wherein the stabilizer is rapeseed oil hydrogenated to an iodine value of 8.

3. A peanut butter according to claim 1 wherein the stabilizer is superglycerinated hydrogenated rapeseed oil.

4. A peanut butter according to claim 1 wherein the stabilizer contains at least about 90% hydrogenated rapeseed oil monoglyceride.

5. A peanut butter according to claim 1 which contains additionally up to 1.0%, by weight of peanut butter, of cottonseed oil hydrogenated to an iodine value not greater than about 10.

6. The method of increasing the resistance of peanut butter to oil separation and improving resistance to product quality change with variation in processing conditions which comprises adding to said peanut butter from about 0.5% to 5.0%, by weight of peanut butter, of a hydrogenated rapeseed oil stabilizer having an iodine value not greater than about 10, said addition being carried out by thoroughly mixing said stabilizer with said peanut butter in a melted condition and then chilling the peanut butter-stabilizer mixture to a temperature sufficiently low that at least some fat solids will form to produce a crystal matrix.

References Cited in the file of this patent

UNITED STATES PATENTS

| 1,058,738 | Ellis | Apr. 15, 1913 |
| 1,395,934 | Stockton | Nov. 1, 1921 |
| 1,926,368 | Brown | Sept. 12, 1933 |
| 2,721,803 | Ginn | Oct. 25, 1955 |

PO-1050
(5/69)

UNITED STATES PATENT OFFICE
CERTIFICATE OF CORRECTION

Patent No. 3,129,102　　　　　　　Dated April 14, 1964

Inventor(s) Judson H. Sanders

It is certified that error appears in the above-identified patent and that said Letters Patent are hereby corrected as shown below:

Column 5, line 2 (that is, in the heading of Table II), "(mm.)" should be -- (mm./10) --.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents